United States Patent [19]

Hilton et al.

[11] Patent Number: 5,410,662

[45] Date of Patent: Apr. 25, 1995

[54] PROGRAMMABLE CONTROL OF EMS PAGE REGISTER ADDRESSES

[75] Inventors: William K. Hilton; James B. Nolan, both of Phoenix; Walter H. Potts, Tempe, all of Ariz.

[73] Assignee: VLSI Technology, Inc., San Jose, Calif.

[21] Appl. No.: 802,075

[22] Filed: Dec. 3, 1991

[51] Int. Cl.⁶ .................... G06F 12/02; G06F 12/00
[52] U.S. Cl. ..................... 395/400; 395/425; 364/245.2; 364/DIG. 1
[58] Field of Search .................... 395/400, 425

[56] References Cited

U.S. PATENT DOCUMENTS 5,247,631  9/1993  Hilton et al. ................ 395/400

Primary Examiner—Joseph L. Dixon
Assistant Examiner—Reginald Bragdon
Attorney, Agent, or Firm—LaValle D. Ptak

[57] ABSTRACT

A full set of 36 EMS registers is provided for a computer, without using any of the registers located in the 256K to 640K address range of the standard RAM. This is accomplished by providing first and second alternate RAM sets of 12 registers each, which are accessed in the same 768K to 960K space as the standard twelve registers located in the 768K to 960K space. Access to the 24 registers in the first and second alternate sets of registers is controlled by two control bits. These bits translate address signals directed to the 768K to 960K space to be directed to one or the other of the first and second alternate sets of 12 registers; so that the alternate registers are accessed in the same space as the standard 12 registers in this 768K to 960K space.

6 Claims, 3 Drawing Sheets

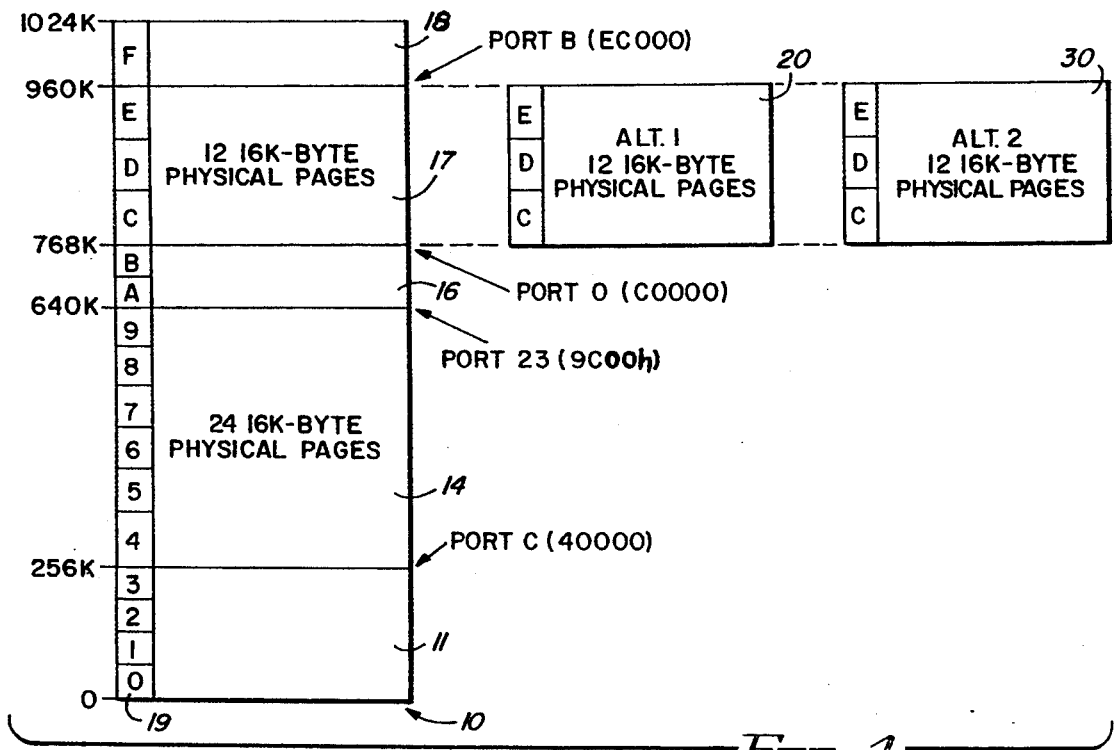

| DATA PORT MAP |||||||||||||||||
|---|---|---|---|---|---|---|---|---|---|---|---|---|---|---|---|---|
| DATA PORT | PAGE SEGMENT | DATA PORT EBh |||||||| DATA PORT EAh ||||||||
| | | D15 | D14 | D13 | D12 | D11 | D10 | D9 | D8 | D7 | D6 | D5 | D4 | D3 | D2 | D1 | D0 |
| 0 | C0/A0 | ↑ | ↑ | ↑ | ↑ | ↑ | ↑ | ↑ | ↑ | ↑ | ↑ | ↑ | ↑ | ↑ | ↑ | ↑ | ↑ |
| 1 | C4/A4 | A29 | | | | A25 | | | | | | | | | | | |
| 2 | C8/A8 | | | | | | | | | | | | | | | | |
| 3 | CC/AC | | A28 | | | | A24 | | | | | | | | | | |
| 4 | D0000 | | | | | | | | | | | | | | | | |
| 5 | D4000 | | | A27 | | | | A23 | | | | | | | | | |
| 6 | D8000 | | | | | | | | | | | | | | | | |
| 7 | DC000 | | | | A26 | | | | A22 | | | | | | | | |
| 8 | E0/B0 | | | | | | | | | | | | | | | | |
| 9 | E4/B4 | | | | | | | | | A21 | | | | | | | |
| A | E8/B8 | | | | | | | | | | | | | | | | |
| B | EC/BC | | | | | | | | | | A20 | | | | | | |
| C | 40000 | | | | | | | | | | | | | | | | |
| D | 44000 | | | | | | | | | | | A19 | | | | | |
| E | 48000 | | | | | | | | | | | | | | | | |
| F | 4C000 | | | | | | | | | | | | A18 | | | | |
| 10 | 50000 | | | | | | | | | | | | | | | | |
| 11 | 54000 | | | | | | | | | | | | | A17 | | | |
| 12 | 58000 | | | | | | | | | | | | | | | | |
| 13 | 5C000 | | | | | | | | | | | | | | A16 | | |
| 14 | 60000 | | | | | | | | | | | | | | | | |
| 15 | 64000 | | | | | | | | | | | | | | | A15 | |
| 16 | 68000 | | | | | | | | | | | | | | | | |
| 17 | 6C000 | | | | | | | | | | | | | | | | A14 |
| 18 | 70000 | | | | | | | | | | | | | | | | |
| 19 | 74000 | | | | | | | | | | | | | | | | |
| 1A | 78000 | | | | | | | | | | | | | | | | |
| 1B | 7C000 | | | | | | | | | | | | | | | | |
| 1C | 80000 | | | | | | | | | | | | | | | | |
| 1D | 84000 | | | | | | | | | | | | | | | | |
| 1E | 88000 | | | | | | | | | | | | | | | | |
| 1F | 8C000 | | | | | | | | | | | | | | | | |
| 20 | 90000 | | | | | | | | | | | | | | | | |
| 21 | 94000 | | | | | | | | | | | | | | | | |
| 22 | 98000 | | | | | | | | | | | | | | | | |
| 23 | 9C000 | ↓ | ↓ | ↓ | ↓ | ↓ | ↓ | ↓ | ↓ | ↓ | ↓ | ↓ | ↓ | ↓ | ↓ | ↓ | ↓ |

FIG. 4

PROGRAMMABLE CONTROL OF EMS PAGE REGISTER ADDRESSES

RELATED APPLICATION

This application is related to application, Ser. No. 07/689,216 filed on Apr. 22, 1991, now U.S. Pat. No. 5,247,631, and assigned to the same assignee as the present application.

BACKGROUND

At the time of the initial introduction of personal computers or micro-computers, the central processing units (CPUs) had a relatively small amount of memory, 16 Kilobytes (16K) in them. Even so, a relatively large number of applications were developed for these computers. Shortly after the introduction of these earliest units, a significantly expanded 8 Bit processor was developed and widely sold, offering 64K of addressable memory. Many software packages were developed for these micro-processors, and effective office automation was under way.

The next major development came from IBM Corporation in the form of a personal computer with ten times this 64K system memory. An operating system known as MS-DOS ® also was introduced to take advantage of the capabilities of the micro-processor chips used in these personal computers. The processor used in these early personal computers had 20 address lines. These 20 address lines permit access to one Megabyte (1M) of memory. This is one million bytes (2 to the twentieth power). The MS-DOS ® operating system was written with this 1 Megabyte limitation in mind. These computers were capable of addressing 640K of memory for data processing as accessible memory, with the remaining memory being reserved for future functions.

In the mid 1980's, some computers were introduced which employed a micro-processor which had, among other improvements, 24 address lines, creating an address access of 16M (2 to the 24th power). Memory chip manufacturers also have continued to reduce the cost of the memory chips (DRAMS); so that increasingly larger memories are economically feasible for personal computer users.

In addition, however, increasingly sophisticated software was written, which required increasing amounts of the available system memory for applications approaching those which previously ran only on much larger mainframe computers or mini-computers. Such sophisticated software, such as the Lotus 1-2-3 ® spreadsheet program, consumed so much of the available 640K memory limit that a solution for increasing the available system memory was required. One solution, which has been utilized to some extent, was the development of different "protected mode" operating systems, such as UNIX ®, XENIX ®, and, most recently, the IBM operating OS/2 ®

MS-DOS ® is not compatible with these protected mode operating system, however, since it operates with its original 1-Megabyte limit, and has no capability for utilizing memory beyond this limit. Because of the extremely large numbers of highly popular personal computers using MS-DOS ® operating software, and, also, because of the large number of software applications developed to work with this operating system, a change to a different industry operating system, to take advantage of increased memory capacity, has not proven to be a desirable approach.

In an effort to overcome the MS-DOS ® limitation, three major companies, Lotus ®, Intel ®, and Microsoft ®, (LIM) joined forces to develop the Expanded Memory Specification (EMS) board. The EMS board expands memory by creating a 192K window in a space between the original 640K limit and 1M of the 1M memory recognized by MS-DOS ®. It should be noted that the address space above 640K was divided into six 64K slices, or equal portions of memory. These slices or memory portions are referred to in personal computing literature as A, B, C, D, E, and F for their hexadecimal representations. Similarly, the hexadecimal representations of the memory from 0K to 640K are divided into ten 64K slices or memory chunks represented by hexadecimal representations 0 through 9. By way of example, the hexadecimal representation A refers to the 64K slice of memory with the 24 Bit address A0000h (where h indicates a hexadecimal number).

The six slices of memory above 640K originally were reserved for various functions. The slice at F, for example, is reserved for BIOS ROM, with video adapters and other interface adapters going into the other slices, A, B, C, D, and E (if such peripherals are present in the specific system being operated).

EMS is designed to use three of these 64K memory slices (C, D, and E) for translating addresses below 1M into memory above 1M. This is accomplished, essentially, by taking an idle slice of memory above the 640K limit and using it as a window to "page" out to more memory. A system known as EMS 4.0 or LIM 4.0 operates to access up to 32M of memory, employing the same general techniques used in the original EMS specification. Currently, EMS defines 36 registers, each of which points to a 16K space. There are four registers in each of the three 64K slices. These are addressed, for example, for the hexadecimal "C" slice, as C 0XXX, C 4XXX, C 8XXXh, and CCXXXh. Similar addresses are used for the D and E slices. In addition, there are 24 registers located in RAM between 256K and 640K addresses 4 to 9. If EMS is used, these 24 registers also may be loaded with values that point to memory above 1M, for a total of 36 possible EMS addresses. To implement all 36 registers, the current EMS specification requires giving up 576K of RAM in the memory under 1M. Such memory then is unavailable for other uses.

A problem exists, however, in the universal application of the EMS system defined generally above. In many applications, where customers desire to expand the memory of their systems, software drivers already are located in some of the spaces capable of use by EMS. For example, frequently, software drivers are located in the C, D, and E spaces. If EMS systems are to be used in computers which already have drivers located in these spaces, modification of the existing software is necessary before the EMS system can be utilized. The reinstallation of software in different memory slices or physical pages of memory is not something to be undertaken lightly, and many customers do not wish to modify software which already has been installed in these locations.

It is desirable to provide the capability of moving EMS registers out of the 0 to 1M RAM through hardware implementation at the option of the user, without modifying or relocating existing software located in memory locations normally used by EMS.

SUMMARY OF THE INVENTION

The addressing of EMS registers is expanded by a programmable gating network to translate the EMS registers to access them at locations other than the conventional locations. This translation is effected by means of control register signals, and by means of hardware implementation.

BRIEF DESCRIPTION OF THE DRAWINGS

FIG. 1 is a diagrammatic representation of an expanded memory addressing system of the type used with a preferred embodiment of this invention;

FIGS. 2 and 3 are charts employed in understanding of the EMS page register mapping of a preferred embodiment of the invention;

FIG. 4 is a data port map useful in describing the operation of the preferred embodiment of the invention;

FIG. 6 a chart of address lists useful in understanding the operation of the circuit of FIG. 5.

DETAILED DESCRIPTION

Figure 5:
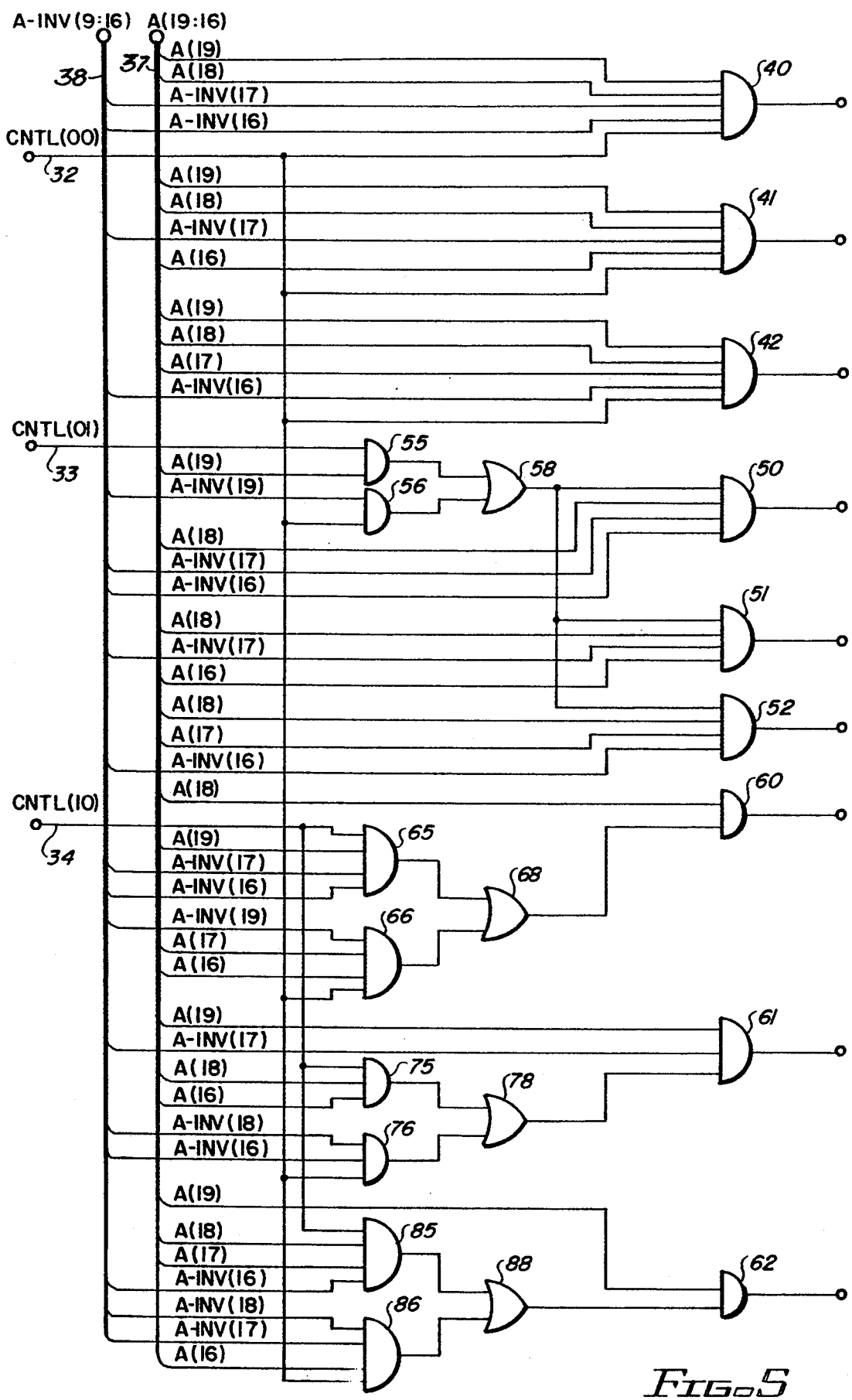
FIG. 5 is a schematic circuit diagram of a preferred embodiment of the invention.

The specification of the above-identified application is incorporated herein by reference.

Reference now should be made to the drawings in which the same reference numbers are used in the different figures to designate the same or similar components. FIG. 1 is a diagrammatic representation of the partitioning of a standard PC micro-processor 1 Megabyte (1M) memory 10, with an addition of two physically separate supplemental or alternate sets of 12 EMS registers ALT1 and ALT2 (20 and 30, respectively) which may be selected by the system of a preferred embodiment of this invention. The actual expanded memory (EMS memory) has not been shown and is of conventional construction.

The standard 1M memory with which MS-DOS® has been designed, and forming the limitation of the MS-DOS® operating program, is shown as the 1 Megabyte memory block 10 (actually 0 to 1024K of memory). This memory typically is organized into different 64K slices or sections, in five major memory groups 11, 14, 16, 17, and 18. These "groups" of 64K slices or memory chunks are not equal in size. For example, from 0K to 256K comprises a memory section 11 where DOS is loaded, along with other application programs. The next section 14, from 256K to 640K, includes the standard RAM memory also used for application programs and data. All of the different 64K slices of memory, found in the sections 11, 14, 16, 17, and 18, are referred to by their hexadecimal address representations indicated in the column 19, on the left hand side of the memory 10. In the sections 11 and 14, the ten different 64 K slices are represented by the hexadecimal address representations 0 through 9, inclusive.

The next section 16 of the memory 10, is a 128K section represented by the hexadecimal addresses A and B. Address A typically is used for EGA displays, and address B is typically used for video displays (including EGA displays). The next section 17, comprising the 192K portion from 768K to 960K, is represented by addresses C, D, and E. Address C typically includes the XT hard disk ROM, EGA displays, and other designated uses. Address D currently is used for some accelerator cards and EMS translated addresses for standard EMS systems. Address E is dedicated to AT hard disk ROM. The final 64K of the memory 10 is section 18, designated by hexadecimal address F. This slice, from 960K to 1024K, has been reserved for ROM BIOS.

Expanded memory specification (EMS) boards utilize addresses at C, D, and E, in section 17, for the translation of addresses in the memory 10 to reach the expanded memory (not shown) either directly or through the added registers of the RAM units 20 or 30. Since all programs which use expanded memory addressing to reach memory above 1M must run under DOS operating systems, memory limitations still are reached. EMS memory actually depletes or diminishes the available DOS memory in the 1M memory block 10, because the pointers and constants, needed for DOS and the EMS program to retrieve data, use memory in the memory unit 10. Consequently, it is possible to deplete the available DOS memory, even though memory in the expanded memory (not shown) is available. The reason is that this additional expanded memory cannot be accessed when the DOS memory is used up. This is particularly true of the standard EMS memory addressing at hexadecimal address locations C, D, and E (768K to 960K).

An EMS system for accessing more than twelve 16 Kbyte EMS registers has been developed, which also employs twenty-four 16-Kbyte registers in the RAM space of the memory located between 256K and 640K. This system is called either EMS 4.0 or LIM 4.0. The problem with utilizing these twenty-four registers, located in this portion of the memory, portion 14 of FIG. 1, is that whenever the EMS accessing uses registers in the RAM space, the space which is employed for EMS is not available for other RAM functions. As indicated in FIG. 1, this problem is eliminated by providing the two alternative sets of registers 20 and 30, addressed via C, D, E EMS addresses mapped or translated as 4, 5, 6 or 7, 8, 9. Each register or address points to a different 16K space; so that there are four registers in each of the three 64K memory slices or chunks (C, D, and E), as explained previously. This also is true of each of the register sets 20 and 30.

A problem exists, however, because even in this area (768K to 960K) many users already have other software drivers located in the C, D, and E spaces. To overcome the problem of conflict in the EMS designated spaces (C, D, and E in the 768K to 960K portion of the memory 10), the present invention employs a pair of programmable control bits (D7 and D6) in an EMS index register (FIG. 3) to permit the user to redefine the location of the EMS registers. These programmable bits operate such that, instead of the EMS registers being accessed at hexadecimal positions C, D, and E, the EMS registers are accessed from the alternative register sets 20 or 30 at hexadecimal positions 4, 5, 6, or 7, 8, 9, depending on the settings of the programmable bits. Consequently, the user has the option of where to place the EMS registers, replacing registers C, D and E with the alternative registers, if desired.

Although the alternative registers 20 and 30 are addressed in the EMS mode as EMS registers 4, 5, 6 or 7, 8, 9, respectively, they are physically separate from the normal 256K to 640K space which therefore is not used for EMS addressing. This is accomplished by mapping C, D, E addresses, as needed. The system to translate EMS addresses is illustrated in the circuit diagram of FIG. 5. The EMS sub-system encoding for the system is shown in FIG. 2. The EMS index register of FIG. 3 and the data port map of FIG. 4 are a programmer's model of the register set which provides flexibility in implementing the EMS specification. The system shown in FIGS. 2 through 5 also permits implementation of all 36 EMS registers via addresses C-D-E only.

Reference now should be made to FIG. 2. This figure illustrates the encoding for the data port EDh of a PC microcomputer. This is a read/write data port. The EMS system disclosed in FIGS. 2 through 5 consists of seventy-two mapping registers. These registers are split into a standard set of thirty-six registers and a three-part EMS alternate set of thirty-six registers. The alternate EMS register set allows rapid hardware context switching, and the system is capable of translating addresses via the EMS registers over an entire 32M range of possible system board memory.

The EMS system is split into two primary groups or parts. The first part is the twelve 16-byte EMS page registers in the range from C0000h to EFFFFh, and the second part is twenty-four backfill (BF) registers which cover addresses 40000h to 9FFFFh. These are the registers shown in section 14 of the RAM of memory 10 of FIG. 1. As shown in FIG. 2, bit D7 of a configuration register EMSEN1 is a global enabler for the EMS page registers. When this bit is a binary "1", the twelve 16-byte registers or pages in section 17 (addresses C, D, E) of FIG. 1 are employed. Each of these twelve registers, however, can be individually disabled if there are system address conflicts by EMS register enable bits. Bits D0 through D7 of EMSEN2, and bits D0 through D3 of EMSEN1 provide this function.

The 24 EMS backfill registers located in section 14 (addresses 4, 5, 6, 7, 8, 9) of the memory of FIG. 1 are enabled by setting bit D6 of EMSEN1 (FIG. 2). These registers are all enabled or all disabled. No individual control is provided. If a full standard LIM EMS 4.0 system is desired for a given PC microcomputer, both bits D6 and D7 of EMSEN1 are set, as are the desired EMS page register enable bits. This, however, removes these registers for any other use. It should be noted that whenever the EMS enable bit D7 is a binary "0" (EMS not enabled), the state of the backfill (BF) enable, bit B6, has no effect on the system.

Instead of using such "backfill" addresses, the alternative registers 20 and 30 may be selected by C, D, E EMS register addresses in the EMS mode when bit B7 of EMS EN1 is set, and bit D6 is a binary "0" (backfill disabled). The conventional EMS page register mapping from C0000h to EFFFFh is not altered by this system. The twelve-page registers always map to CXXXXh, DXXXXh, and EXXXXh, in that order. The C, D, E addresses from 768K to 960K are unchanged. The C, D, E addresses, however, may be mapped to appear as EMS register addresses to select the alternative registers 20 or 30 through 4, 5, 6 or 7, 8, 9 addresses, respectively.

Consideration of FIG. 2, in conjunction with FIG. 4, the data port map, illustrates the data mapping for the 36 registers of either the standard or the two alternate registers 20 and 30. FIG. 3 illustrates the encoding, which is used at the E8h index port to select which of the three sets of 12 EMS registers is to be addressed for the selection of the desired one of the 36 possible EMS registers. The E8h index is a standard index; and it is located in the I/O address space, part of what is called the configuration registers used to set up various programmable system parameters in the computer. This is accomplished by the settings noted in FIG. 3 for control bits D6 and D7. If both of these bits are binary "0" (00), the set 17 of 12 EMS registers, C, D, E, is selected by the data port map of FIG. 4. If these two bits are binary "01", the EMS register set 20 of 12 registers, addressed as translated addresses 4, 5, 6 selected via the EMS addresses for C, D, E, is selected. If these two bits are binary "10", the EMS register set 30 of 12 registers is selected, addressed by translated addresses 7, 8, 9, via conventional addresses for C, D, E. The combination "11" of bits D6 and D7 is unused in the present system.

Reference now should be made to FIGS. 4 and 5, which together illustrate the implementation employed by the system to select valid EMS addressing for the full 36 registers out of the C, D, E register locations of the standard 1M memory, or for the two alternative registers 20 and 30. Obviously, in any system, to recognize an address as an EMS address to an extended memory, in place of the otherwise standard address within the original 1M memory 10, the address must be uniquely identified as an EMS address, and not as some other type of program address located within the memory 10. This is accomplished by providing a signal on an output terminal (not shown) in response to EMS EN1, bit D7 (FIG. 2), each time an address applied to the system constitutes a valid EMS address. The actual address is the same as used with any standard personal computer to access the particular hexadecimal location within the memory 10.

In the present system, all of the 36 EMS registers are addressed through addresses to the C, D, E memory locations; so that none of the addresses which are located in the "backfill" portion 14 of the memory 10 are used. Thus, the memory 10 is free for normal programming use, and the 24 EMS registers, other than the 12 located in the C, D, E locations of the memory 10 (portion 17), are located, physically, outside the one megabyte memory 10.

The control bits D6 and D7 at the E8h index port (FIG. 3) are sensed, and variously combined in appropriate circuitry (not shown) to produce binary "1" enabling signals on the selected one of three control leads 32, 33, and 34 (FIG. 5) whenever the indicated combinations (00; 01; or 10), respectively, are produced. When the control combination "00" is present, an enabling binary "1" signal is applied over the input lead 32 to seven selected coincidence gates in the form of AND gates 40, 41, 42, 56, 66, 76, and 86 in the circuit shown in FIG. 5 to enable those gates. In this mode, no translated addressing takes place. The three AND gates 40, 41, and 42 each produce an output corresponding to the selected C, D, or E address locations (data ports 0 through 9, A and B) of the data port map of FIG. 4. The different page segments for each of these address locations are indicated in FIG. 4. If an EMS address is selected, the EMSEN1 bit D7 is a binary "1" indicating EMS enable. If conventional, non-EMS selection is effected, D7 of EMSEN1 is a binary "0".

In a similar manner, the three AND gates 50, 51, and 52 are employed to select 4, 5, 6 addresses for data port page segments C through F and 10 through 17 (FIG. 4) or, alternatively, are translated addresses, in the EMS mode, for addresses in the alternative register 20 selected by translated C, D, E addresses.

In a like manner, the AND gates 60, 61, and 62 provide either conventional 7, 8, 9 address selection corresponding to data ports 18 through 23 (FIG. 4) or are employed in the EMS mode, to select the alternative register 30 by way of translated register addresses C, D, E.

To address any one of the 36 EMS registers, address bits A(31:20), (31 down to 20) all are binary "0". Then six additional bits, A(19:14) are required to select one of the 36 (identified as 0 to 23 hex in FIG. 4) addresses as an EMS register address. The lowest level bits, bits A15 and A14, are always used to select one of four possible registers in each group of four registers (such as Groups C, D, or E, for example) and these bits are always the same for the respective selected register position, regardless of the register group. This is true however the EMS address register location is defined. Consequently, these bits A15 and A14 do not require any consideration in the decoding necessary to select between standard EMS and reconfigured or translated EMS addresses. For that reason, the circuit of FIG. 5 does not include the inputs corresponding to these bits, in order to avoid unnecessary cluttering of the drawing.

The selection within any one of the address groupings, which is effected by the four possible combinations of these two bits A15 and A14, is accomplished in accordance with standard address decoding techniques. For example, the C0, C4, C8, and CC series addresses are represented by the encoding of bits A15 and A14 as "00", "01", "10", "11", respectively. This same pattern is true for the other register groups (4, 5, 6 and 7, 8, 9), however the particular EMS space might be redefined.

The coding for bits A(19:16) for the C, D, E; 4, 5, 6; and 7, 8, 9 registers is indicated in FIG. 6. Reference to FIG. 6 should be considered in conjunction with the circuit of FIG. 5 for an understanding of the EMS address selection which is effected in response to the three different combinations of the two control bits, namely the combinations "00", "01", and "10" as applied to the control input leads 32, 33, and 34 of FIG. 5.

As mentioned, when the normal addressing is to take place for the 36 registers represented in portions 14 and 17 of the memory 10, the control bits are configured as "00" resulting in a positive or binary "1" signal applied to the lead 32. The signals on the other two control input leads 33 and 34 are low binary "0" signals at this time. This means that the AND gates 55, 65, 75, and 85, which are connected to one or the other of the control leads 33 and 34, are disabled and are incapable of passing any signals so long as this condition exists. A positive or binary "1" signal on the lead 32, however, enables the AND gates 40, 41, 42, 56, 66, 76, and 86 of the logic circuit shown in FIG. 5 to permit normal addressing of the nine different address groups to be supplied through to the outputs of the respective gates 40, 41, 42, 50, 51, 52, 60, 61, and 62. Any given one of the address combinations shown in FIG. 6 then enables the selected one of the output AND gates, shown on the right hand side of FIG. 5, to permit the completion of the specific address when the decoding of address bits A(15:14) is combined with the selected AND gate output in a conventional manner. The use of the selected addresses then is effected in either the normal mode of operation of the computer or in the EMS mode, in accordance with the nature of the EMSEN1 bit D7 (FIG. 2).

A binary "1" signal applied to any one of the various AND gates of FIG. 5 acts as an enabling signal. For combinations of signals where a binary "0" is used in the address, however, the inverted representation of that same signal must be used to supply a binary "1" to the selected AND gate for the signal decoding.

By way of example, reference should be made to the various inputs to the "D" AND gate 41. When the normal addressing is desired, this AND gate, along with others already mentioned, is enabled by the binary "1" signal applied to its lower input from the lead 32 (D6 and D7 of E8h data port both "0". From an examination of FIG. 6, it can be seen that the address for register "D" is established by A(19:16) or "1101". Thus, address bits A19, A18, and A16 are all binary "1". Address bit A17 is a binary "0".

A pair of busses 37 and 38 are used to supply the normal (bus 37) address signals (19:16) and the inverted (bus 38) address signals A-INV(19:16). The branches extending from each of these busses of FIG. 5 show, for each of the branches, the individual signals in the various sets which are applied to the different gates in the gating network of FIG. 5. For gate 41, the branches A(19), A(18), and A(16) are applied from the normal or non-inverted signal inputs from bus 37. This is because for decoding register "D" the signals are represented by binary "1's". The final input to this gate 41, however, is from the bus 38, and is A-INV(17). This is because this bit of the address for the "D" register is a binary "0". When this signal is inverted, it becomes a binary "1"; so that all of the inputs to the AND gate 41 are positive, causing an output to appear from this AND gate. The AND gate 41 is the only AND gate which will have a positive or binary "1" output appearing on it for the decoding of this combination "1101" for the address bits A(19:16).

A similar decoding path for the various inputs of the other addresses for all nine of the address groups may readily be found in the correlation between FIG. 6 and the inputs to the various AND and OR gates shown in FIG. 5. For supplying the enabling inputs to the AND gates 50, 51, and 52, the signals on the lead 32 enable the AND gate 56 to respond to signals A-INV(19) applied to it from the bus 38. The output of the AND gate 56 then is passed through an OR gate 58 to enable or disable all of the AND gates 50, 51, and 52. The other signals applied to these three gates 50, 51, and 52, result in a selected output whenever the appropriate combination for decoding the normal group 4, 5, 6 signals is desired.

A similar situation exists with respect to the lowermost group of gates 60, 61, and 62 corresponding to registers 7, 8, 9. The lower AND gates 66, 76, and 86 are enabled to control the signals applied to OR gates 68, 78, and 88 which, respectively, enable or disable the output AND gates 60, 61, and 62. Although a more complex arrangement of gate inputs exists for the lowermost three output AND gates 60, 61 and 62, it is readily apparent from an examination of the signal patterns of FIG. 6 and the inputs supplied to the various gates of the manner in which these address signals enable a selected one of the gates 60, 61 and 62 in this mode of operation.

Assume now that the control signals on the inputs 32 and 34 are both binary "0", and that the control bit selection for the combination "01" (D7 "0" and D6 "1" of E8h index port) is present. This means a high or binary "1" signal appears on the control lead 33. This is done to permit addresses C, D, E in the EMS mode, to be mapped to access the registers represented by the AND gates 50, 51, and 52 (4, 5, 6) instead of the normal C, D, E addresses represented by the AND gates 40, 41, and 42. Since the control bit signal on the lead 32 is a binary "0" in this condition, the AND gates 40, 41, 42, 56, 66, 76, and 86 all are disabled. Similarly, the AND gates 65, 75, and 85 are disabled by the binary "0" over the lead 34. This means that the AND gates 60, 61, and 62 are disabled, but that control of the output signals for the AND gates 50, 51, and 52 now is effected through the signals applied directly to these AND gates and from the AND gate 55 and the OR gate 58. In this mode, only C, D, E addresses from the top line of register addresses shown in FIG. 6 can produce an output from the output AND gates 50, 51, and 52 of FIG. 5. The normal 4, 5, 6 addresses are blocked from functioning because the AND gate 56 is disabled. This mapping is done in the EMS mode to select the memory 20 (Alt 1 of FIG. 1).

An examination of the differences between the register addresses for C, D, and E and those for 4, 5, and 6, respectively, shows that only the A(19) bit is different between these two address sets. Thus, to effect a mapping of the "C" register address to the "4" register address, or the D and E addresses to the addresses for registers 5 and 6, the address bit A19 is substituted for the address bit A-INV(19). A straight mapping of the C, D, and E addresses now accesses, respectively, the 4, 5, 6 addresses represented by AND gates 50, 51, and 52. Once again, the label inputs to these various gates indicate the manner in which this is done, utilizing AND gate 55, OR gate 58 and the direct inputs to the gates 50, 51, and 52.

The bottom three AND gates 60, 61, and 62 (7/C, 8/D and 9/E) decode the selection between the normal case and the case when the control signal (10) (D7 "1" and D6 "0" of E8h index port) causes a binary "1" to appear on the lead 34. In this condition, the signals on the leads 32 and 33 are binary "0"; so that all of the AND gates connected to these leads are disabled. The mapping for the C, D, E addresses to be accessed at addresses 7, 8, 9 is more complex than the decode described above to cause a mapping to addresses 4, 5, 6. The manner in which it is accomplished, however, is identical to the manner of effecting the translated addresses for the twelve registers accessed at 4, 5, 6.

The mapping from C, D, E addresses to those accessed at 7, 8, 9 selects the memory 30, alternative 2 of FIG. 1, for effecting the EMS address mapping. This is accomplished by enabling the upper three AND gates 65, 75, and 85 to supply outputs through the OR gates 68, 78, and 88 to the lower inputs of the output AND gates 60, 61, and 62. The chart of FIG. 6 indicates which of the normal and inverted inputs must be utilized in order to effect the desired mapping. The arrangements of the gates connected to the inputs of the output AND gates 60, 61, and 62 indicates the manner in which this is done by the signals appearing on the busses 37 and 38.

The system which has been described permits the user substantial flexibility in implementing the EMS specification. As a result of the programmable option, which is indicated by the gating circuit of FIG. 5, the user is able to implement 36 registers for EMS using addresses for only the 12 registers C, D, E, of the conventional 1 Megabyte RAM 10. The other 24 EMS registers are not located in the space of the RAM 10, but are located in separate RAM registers 20 and 30 dedicated to EMS use. Each of these alternative RAM memories continue to be accessed in the same 768K to 960K space as the standard 12 registers of portion 17 of FIG. 1. Access to the alternative or additional registers 20 and 30 is controlled by the two control bits (FIG. 3) in the manner described above. Thus, the 24 registers located in the RAM 10 in the 256K to 640K address range of portion 14, are left free for other options and are not required for the EMS extension.

All of the EMS addressing is effected by utilizing only the C, D, E addresses; and the particular location of the registers which are actually selected is effected, as described above, under the control of the two control bits, which produce the control signals on the leads 32, 33 and 34 of FIG. 5.

The foregoing description of the preferred embodiment of the invention should be considered as illustrative only, and not as limiting. Various changes and modifications will occur to those skilled in the art, without departing from the true scope of the invention as defined in the appended claims.

We claim:

1. An expanded memory specification (EMS) reconfiguration system including in combination:
   addressing means for supplying at least first and second address signals for addressing at least first and second groups of random access memory (RAM) memory registers between 0 and 1 megabyte;
   first gate means coupled with said addressing means for producing output signals in response to said first address signals directed to said first group of RAM memory registers;
   second gate means coupled with said addressing means for producing output signals in response to said second address signals directed to said second group of RAM memory registers;
   control signal supply means coupled with said first and second gate means for selectively supplying control signals to said first and second gate means, causing said first gate means to be non-responsive to said first address signals, and said second gate means to be responsive to said first address signals and non-responsive to said second address signals; and
   at least one alternate RAM memory register separate from said first and second groups of RAM memory registers, said supplemental RAM memory register coupled with said second gate means and responsive to signals appearing on the outputs of said second gate means when said second gate means is responsive to said first address signals.

2. The combination according to claim 1 wherein said first and second gate means each include a plurality of gates.

3. The combination according to claim 2 wherein said second gate means responds to control signals from said control signal supply means for specifically mapping the addresses for at least some registers in the 256 kilobytes (K) to 640K space of a 1 Mb RAM memory to addresses directed to the 768K to 960K space for accessing said alternate RAM memory register.

4. The combination according to claim 1 wherein said first and second gate means comprise a plurality of multiple input gates, each responsive to predetermined combinations of multiple bit address signals and said control signals for operation.

5. The combination according to claim 4 wherein said second gate means responds to control signals from said control signal supply means for specifically mapping the addresses for at least some registers in the 256 kilobytes (K) to 640K space of a 1 Mb RAM memory to addresses directed to the 768K to 960K space for accessing said alternate RAM memory register.

6. The combination according to claim 1 wherein said second gate means responds to control signals from said control signal supply means for specifically mapping the addresses for at least some registers in the 256 kilobytes (K) to 640K space of a 1 Mb RAM memory to addresses directed to the 768K to 960K space for accessing said alternate RAM memory register.

* * * * *